(12) United States Patent
Marciante et al.

(10) Patent No.: US 11,081,851 B2
(45) Date of Patent: Aug. 3, 2021

(54) LMA FIBERS FOR SUPPRESSION OF THERMAL MODE INSTABILITY

(71) Applicant: University of Rochester, Rochester, NY (US)

(72) Inventors: John R. Marciante, Webster, NY (US); Jordan P. Leidner, Rochester, NY (US)

(73) Assignee: University of Rochester, Rochester, NY (US)

( * ) Notice: Subject to any disclaimer, the term of this patent is extended or adjusted under 35 U.S.C. 154(b) by 0 days.

(21) Appl. No.: 16/318,396

(22) PCT Filed: Jul. 20, 2017

(86) PCT No.: PCT/US2017/042968
§ 371 (c)(1),
(2) Date: Jan. 17, 2019

(87) PCT Pub. No.: WO2018/075111
PCT Pub. Date: Apr. 26, 2018

(65) Prior Publication Data
US 2019/0288474 A1  Sep. 19, 2019

Related U.S. Application Data

(60) Provisional application No. 62/364,542, filed on Jul. 20, 2016.

(51) Int. Cl.
*H01S 3/067* (2006.01)
*H01S 3/16* (2006.01)
(Continued)

(52) U.S. Cl.
CPC ........ *H01S 3/0672* (2013.01); *G02B 6/02009* (2013.01); *G02B 6/02023* (2013.01);
(Continued)

(58) Field of Classification Search
CPC ..... H01S 3/0804–08045; H01S 3/0672; H01S 3/06729; H01S 3/06737; H01S 3/06745;
(Continued)

(56) References Cited

U.S. PATENT DOCUMENTS 4,017,288 A * 4/1977 French ............... C03B 37/0142
65/414
6,778,747 B1 * 8/2004 Bhagavatula ..... C03B 37/01211
385/123
(Continued)

FOREIGN PATENT DOCUMENTS

CN  102171595  8/2011
CN  103649797  3/2014
(Continued)

OTHER PUBLICATIONS

Hansen et al., "Themally Induced Mode Coupling in Rare-Earth Doped Fiber Amplifiers", Jun. 15, 2012, Optics Letters, vol. 37, No. 12, 2382-2384. (Year: 2012).*
(Continued)

*Primary Examiner* — Joshua King
(74) *Attorney, Agent, or Firm* — Kilpatrick Townsend & Stockton LLP

(57) ABSTRACT

An optical fiber, such as in some instances a high-power, diode-pumped, dual-clad, ytterbium-doped fiber amplifier (YDFAs), having a fundamental mode and at least one higher order mode, wherein the higher order mode or modes have mode areas that are substantially larger than a mode area of the fundamental mode.

16 Claims, 9 Drawing Sheets

(51) Int. Cl.
*G02B 6/028* (2006.01)
*G02B 6/02* (2006.01)

(52) U.S. Cl.
CPC ...... *H01S 3/06708* (2013.01); *G02B 6/02047* (2013.01); *G02B 6/0281* (2013.01); *H01S 3/1618* (2013.01)

(58) Field of Classification Search
CPC ............ H01S 2301/03; H01S 2301/04; H01S 2301/06; H01S 2301/20–206; H01S 3/06708–06787; G02B 6/02009; G02B 6/02023; G02B 6/02047; G02B 6/0281
See application file for complete search history.

(56) References Cited

U.S. PATENT DOCUMENTS

| | | | |
|---|---|---|---|
| 7,130,514 B1* | 10/2006 | Chen | G02B 6/03611 385/123 |
| 2001/0021298 A1* | 9/2001 | Mukasa | G02B 6/02019 385/124 |
| 2002/0003926 A1* | 1/2002 | Enomoto | G02B 6/02095 385/37 |
| 2003/0044150 A1* | 3/2003 | Van Bergen | G02B 6/02004 385/127 |
| 2003/0063629 A1 | 4/2003 | Davis et al. | |
| 2003/0174984 A1 | 9/2003 | Chiang et al. | |
| 2004/0052495 A1* | 3/2004 | Englund | G02B 6/2552 385/141 |
| 2007/0116416 A1* | 5/2007 | Chen | G02B 6/03694 385/123 |
| 2007/0147751 A1* | 6/2007 | Fini | G02B 6/02009 385/123 |
| 2007/0147755 A1* | 6/2007 | Hasegawa | G02B 6/03694 385/123 |
| 2008/0118213 A1* | 5/2008 | Andrieu | G02B 6/02038 385/127 |
| 2009/0059353 A1* | 3/2009 | Fini | G02B 6/02009 359/341.3 |
| 2009/0092365 A1* | 4/2009 | Donlagic | G02B 6/0288 385/124 |
| 2009/0324168 A1* | 12/2009 | Hotoleanu | G02B 6/02023 385/28 |
| 2010/0195194 A1* | 8/2010 | Chen | G02B 6/03644 359/341.3 |
| 2010/0202481 A1* | 8/2010 | Morasse | G02B 6/03616 372/40 |
| 2011/0064367 A1* | 3/2011 | Molin | G02B 6/0288 385/100 |
| 2011/0141555 A1 | 6/2011 | Fermann et al. | |
| 2011/0149383 A1* | 6/2011 | Kashiwagi | H01S 3/094007 359/341.3 |
| 2012/0105947 A1* | 5/2012 | Kashiwagi | H01S 3/06733 359/341.3 |
| 2013/0064554 A1* | 3/2013 | Li | G02B 6/02009 398/143 |
| 2013/0071114 A1* | 3/2013 | Bickham | G02B 6/0288 398/44 |
| 2014/0055843 A1* | 2/2014 | Roland | H01S 3/06754 359/341.3 |
| 2014/0093205 A1* | 4/2014 | Gruner-Nielsen | G02B 6/0288 385/43 |
| 2014/0219606 A1* | 8/2014 | Sorin | G02B 6/42 385/27 |
| 2014/0328566 A1* | 11/2014 | Bickham | G02B 6/02395 385/128 |
| 2015/0192733 A1 | 7/2015 | Abedin et al. | |
| 2015/0293300 A1* | 10/2015 | Fini | G02B 6/02019 385/124 |
| 2016/0181756 A1* | 6/2016 | Muendel | H01S 3/094007 372/6 |
| 2016/0226210 A1* | 8/2016 | Zayhowski | H01S 3/0085 |
| 2016/0306108 A1* | 10/2016 | Sun | H04J 14/04 |
| 2016/0352066 A1* | 12/2016 | Redding | H01S 3/094007 |
| 2017/0031089 A1* | 2/2017 | de Montmorillon | G02B 6/0281 |
| 2017/0336558 A1* | 11/2017 | Endo | G02B 6/02009 |
| 2019/0003902 A1* | 1/2019 | Wang | G02B 6/0288 |
| 2019/0162897 A1* | 5/2019 | Munige | G02B 6/03683 |
| 2019/0302354 A1* | 10/2019 | Kanskar | H01S 3/06729 |
| 2020/0110217 A1* | 4/2020 | Bigot | G02B 6/02042 |

FOREIGN PATENT DOCUMENTS

| | | | |
|---|---|---|---|
| CN | 109716184 | 5/2019 | |
| EP | 3488274 | 5/2019 | |
| WO | WO-2013152862 A1 * | 10/2013 | ......... H01S 3/06737 |
| WO | 2018075111 A2 | 4/2018 | |
| WO | 2018075111 A3 | 8/2018 | |

OTHER PUBLICATIONS

Saleh et al., "Fundamentals of Photonics: FiberOptics", 1991, John Wiley & Sons, Inc, chapter 8, 272-308. (Year: 1991).*
Tao et al., "Influence of core NA on Thermal-Induced Mode Instabilities in High Power Fiber Amplifiers", Jun. 3, 2015, ARXIV: 1506.01300 [physics.optics], (Year: 2015).*
Brown et al., "Thermal, Stress, and Thermo-Optic Effects in Higher Average Power Double-Clad Silica Fiber Lasers", IEEE J. Of Quant. Electron., vol. 37, 2001, pp. 207-217.
Bruesselbach et al., "Low-Heat Highpower Scaling Using Ingaas Diode-Pumped Yb:YAG Lasers", IEEE J. Sel. Top. Quantum Electron., vol. 3, No. 1, 1997, pp. 105-116.
Chung et al., "An Assessment of Finite Difference Beam Propagation Method", IEEE J. Quantum Electronics, vol. 26, No. 8, 1990, pp. 1335-1339.
Eidam et al., "Experimental Observations of the Threshold-Like Onset of Mode Instabilities in High Power Fiber Amplifiers", Optics Express, vol. 19, No. 14, 2011, pp. 13218-13224.
Eidam et al., "Preferential Gain Photonic-Crystal Fiber for Mode Stabilization at High Average Powers", Opt. Express, vol. 19, No. 9, 2011, pp. 8656-8661.
Eznaveh et al., "Bidirectional Pump Configuration for Increasing Thermal Modal Instabilities Threshold in High Power Fiber Amplifier", Proc. of SPIE, vol. 9344, 2015, pp. 93442G-1-93442G-5.
Fini, "Bend-Resistant Design of Conventional and Microstructure Fibers with Very Large Mode Area", Opt. Express, vol. 14, No. 1, 2006, pp. 69-81.
Guan et al., "Pump-induced, Dual-Frequency Switching in a Short-Cavity, Ytterbium-Doped Fiber Laser", Optics Express, vol. 15, No. 23, 2007, pp. 14979-14992.
Hadley et al., "Transparent Boundary Condition for the Beam Propagation Method", IEEE J. Quantum Electron., vol. 28, No. 1, 1992, pp. 363-370.
Hansen et al., "Thermally Induced Mode Coupling in Rare-Earth Doped Fiber Amplifiers", Optics Letters, vol. 37, No. 12, Jun. 15, 2012, pp. 2382-2384.
Jansen et al., "Thermally Induced Waveguide Changes in Active Fibers", Optics Express, vol. 20, No. 4, 2012, pp. 3997-4008.
Jauregui et al., "Mode Instabilities in High-power Bidirectional Fiber Amplifiers and Lasers", In Advanced Solid State Lasers, OSA Technical Digest (online) (Optical Society of America, 2015), Jan. 2015.
Jauregui et al., "Physical Origin of Mode Instabilities in High-Power Fiber Laser Systems", Optics Express, vol. 20, No. 12, 2012, pp. 12912-12925.
Jiang et al., "Impact of Transverse Spatial-Hole Burning on Beam Quality in Large-Mode-Area Yb-Doped Fibers", Journal of the Optical Society of America, vol. 25, No. 2, 2008, pp. 247-254.
Marciante, "Gain Filtering for Single-Spatial-Mode Operation of Large-Mode-Area Fiber Amplifiers", IEEE Journal of Selected Topics in Quantum Electronics, vol. 15, No. 1, Jan./Feb. 2009, pp. 30-36.
Marciante et al., "High-Gain, Polarization-Preserving, Yb-Doped Fiber Amplifier for Low-Duty-Cycle Pulse Amplification", Appl. Opt., vol. 45, No. 26, 2006, pp. 6798-6804.

(56) References Cited

OTHER PUBLICATIONS

Marciante et al., "Near-diffraction-Limited Operation of Step-Index Large-Mode-Area Fiber Lasers via Gain Filtering", Optics Letters, vol. 35, No. 11, Jun. 1, 2010, pp. 1828-1830.
Marciante et al., "Semi-Guiding High-Aspect-Ratio Core (Sharc) Fiber Amplifiers with Ultra-large Core Area for Single-mode kW Operation in a Compact Coilable Package", Optics Express, vol. 20, No. 18, 2012, pp. 20238-20254.
Naderi et al., "Investigations of Modal Instabilities in Fiber Amplifiers through Detailed Numerical Simulations", Optice Express, vol. 21, No. 13, 2013, pp. 16111-16129.
Rao et al., "Complex Propagators for Evanescent Waves in Bidirectional Beam Propagation Method", J. Lightwave Technol., vol. 18, No. 8, 2000, pp. 1155-1160.
Robin et al., "Gain-Tailored SBS Suppressing Photonic Crystal Fibers for High Power Applications", Proc. SPIE 8237, Fiber Lasers IX: Technology, Systems, and Applications, vol. 8237D, Feb. 15, 2012, 10 pages.
Smith et al., "Direct Measurement of Bend-Induced Mode Deformation in Large-Mode-Area Fibers", Opt. Express, vol. 20, 2012, pp. 4436-4443.
Ward et al., "Origin of Thermal Modal Instabilities in Large Mode Area Fiber Amplifiers", Opt. Express, vol. 20, 2012, pp. 11407-11422.
Yamauchi et al., "Beam Propagation Analysis of Optical Fibres by Alternating Direction Implicit Method", Electron. Lett., vol. 27, No. 18, 1991, pp. 1663-1666.
Ma et al., Finite-Difference Beam-propagation Method for Anisotropic Waveguides with Torsional Birefringence, Optics Express, vol. 26, No. 4, Feb. 19, 2018, 9 pages.
Rockwell et al., Semi-Guiding High-Aspect-Ratio Core (SHARC) Fiber Providing Single-Mode Operation and an Ultra-Large Core Area in a Compact Coilable Package, Optics Express, vol. 19, No. 15, Jul. 15, 2011, pp. 14746-14762.
Cheng et al., Fabrication and Characterization of a Three-Core Chalcogenide—Tellurite Hybrid Optical Fiber, Optics Communications, vol. 341, Apr. 15, 2015, pp. 252-256.
Hansen et al., Fully Dispersion Controlled Triangular-Core Nonlinear Photonic Crystal Fiber, Optical Fiber Communication Conference, PD2-1, Mar. 28, 2003, 3 pages.
International Application No. PCT/US2017/042968, International Preliminary Report on Patentability dated Jan. 31, 2019, 13 pages.
International Application No. PCT/US2017/042968, International Search Report and Written Opinion dated Jul. 6, 2018, 18 pages.
International Application No. PCT/US2017/042968, Invitation to Pay Add'l Fees and Partial Search Report dated May 14, 2018, 13 pages.
Ryf et al., Impulse Response Analysis of Coupled-Core 3-Core Fibers, ECOC Technical Digest, Sep. 16-20, 2012, 3 pages.
Wang et al., Bending Orientation Insensitive Large Mode Area Photonic Crystal Fiber with Triangular Core, IEEE Photonics Journal, vol. 5, No. 4, Aug. 2013, 9 pages.
Zhao et al., A Novel Three-Core Fiber Optic Spanner, 24th International Conference on Optical Fibre Sensors, edited by Hypolito Jose Kalinowski, Jose Luis Fabris, Wojtek J. Bock, Proc. of SPIE, vol. 9634, Sep. 28, 2015, 4 pages.
U.S. Appl. No. 16/318,396, "Non-Final Office Action", dated Apr. 1, 2020, 18 pages.
CN 201780058004.7, "Office Action", dated Mar. 4, 2020, 10 pages.

\* cited by examiner

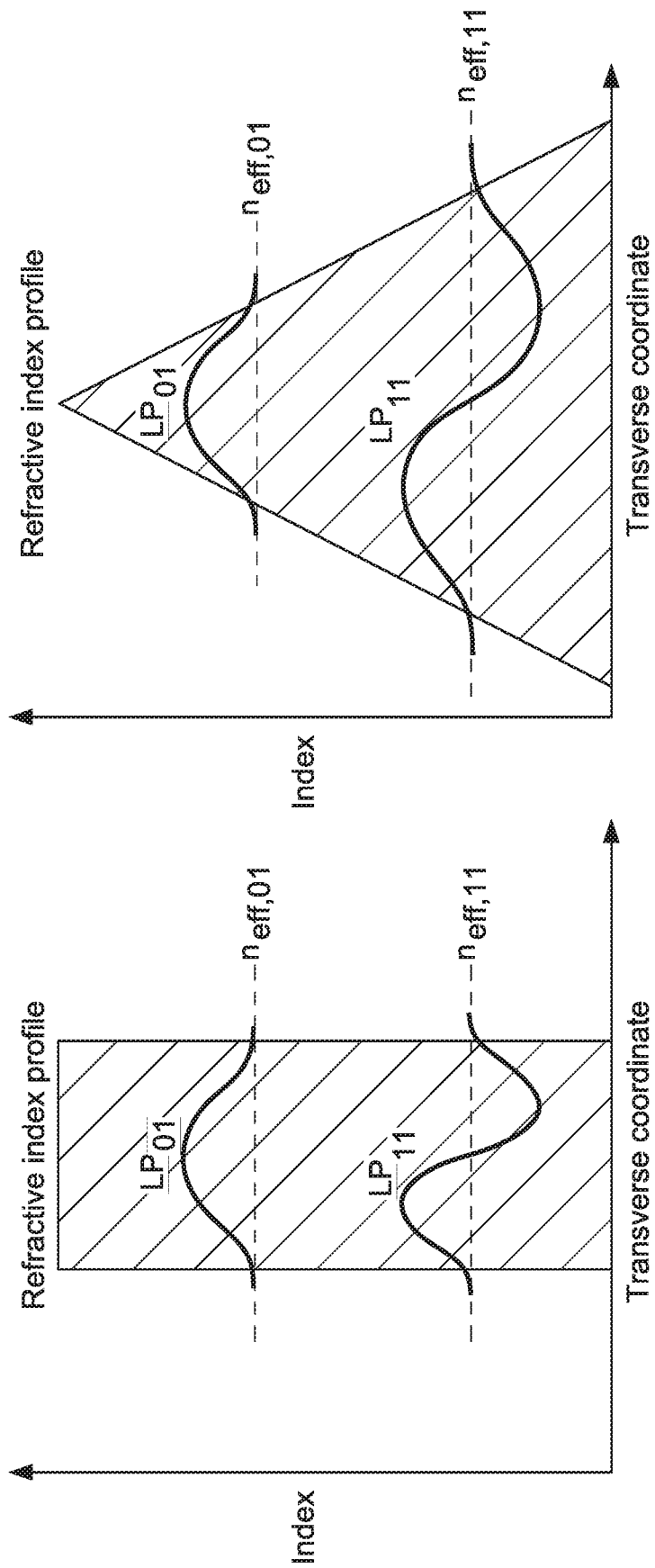

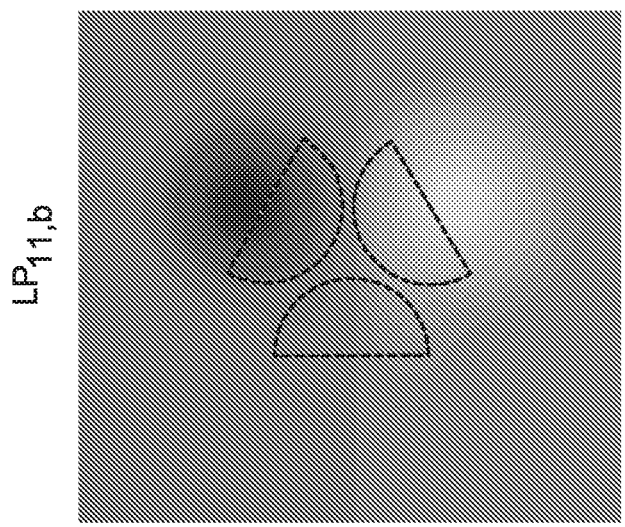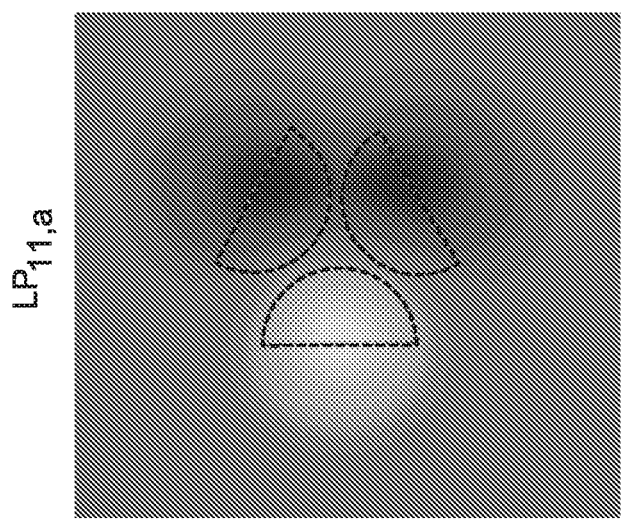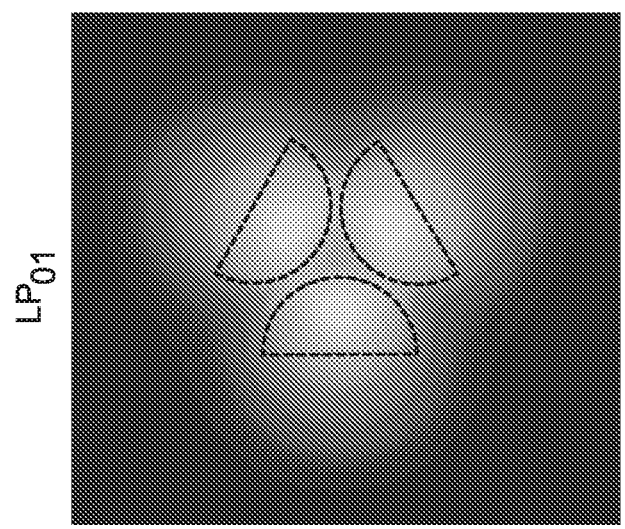
FIG. 9

LMA FIBERS FOR SUPPRESSION OF THERMAL MODE INSTABILITY

CROSS-REFERENCE TO RELATED APPLICATION

This application claims priority to U.S. Provisional Application Ser. No. 62/364,542, filed Jul. 20, 2016 for "LMA Fibers for Suppression of Thermal Mode Instability," the entire contents of which are incorporated by reference.

STATEMENT REGARDING FEDERALLY SPONSORED RESEARCH OR DEVELOPMENT

This invention was made with Government support under Grant FA9451-14-1-0253 awarded by the United States Air Force. The Government has certain rights in the invention.

RELATED FIELDS

Large-mode-area fibers such as large-mode-area fibers for use as fiber amplifiers in high power applications.

BACKGROUND

High-power, diode-pumped, dual-clad, ytterbium-doped fiber amplifiers (YDFAs) are desired for directed energy and machining applications due to their small footprints, high efficiencies, and thermal properties. In the development of amplifiers with higher optical output powers, such devices have been driven to utilizing large-mode-area (LMA) cores. LMA fibers are nominally multimode in nature, and bend loss is typically used to ensure near single-mode operation with good beam quality.

Unfortunately, it has been reported that even if the beam quality can be retained at low power, LMA fibers driven to higher powers exhibit thermally induced mode instability (TMI), also called stimulated thermal Rayleigh scattering (STRS). This phenomenon is characterized by a significant fraction of optical power being exchanged between modes of the fiber at kHz rates, even if bend loss would otherwise provide good stable beam quality. To date, some methods have been demonstrated to reduce the impact of TMI and increase its threshold, but significant improvements that do not degrade system performance are still missing.

SUMMARY

By understanding the relevant physical phenomena, we have conceived of and modeled a new class of optical fibers that increase the TMI threshold in high-power fiber amplifiers. By evaluating the core physics, we have discovered that beam quality degradation arising from the coupling between modes is in part dictated by the spatial overlap between the desired fundamental mode $\Phi_j$, a non-desirable higher-order mode $\Phi_k$, and the thermal perturbation to the refractive index $\delta n$ as shown in the equation below.

$$K_{j,k}^{\delta n}(z) = \iint \Phi_j^*(x,y) \delta n(x,y,z) \Phi_k(x,y) dx dy \quad (1)$$

It is recognized that although coupling of power out of the desired fundamental mode can be accomplished by any higher-order mode in theory, in practice there is a "nearest" mode that tends to present the largest problem. In conventional LMA fibers, the desired fundamental mode is the $LP_{01}$ mode and has a Gaussian-like spatial distribution, and the "nearest" mode that tends to degrade the beam quality is the $LP_{11}$ mode.

We have discovered that the TMI threshold can be significantly increased if the mode-coupling coefficient $\kappa_{j,k}^{\delta n}$ is reduced. We have further discovered that this coupling coefficient can be reduced in at least two ways: (1) by reducing the spatial overlap between the fundamental and higher-order modes, and (2) by reducing the spatial overlap of the heat generation region with either the fundamental mode or the higher-order modes, specifically the ones that represent the largest problem.

In one example, an optical fiber has a fundamental mode and at least one higher order mode, wherein the higher order mode or modes all have physical mode areas that are substantially larger than a physical mode area of the fundamental mode.

In some instances, the higher order mode or modes may all have physical mode areas that are each at least 60% larger than the physical mode area of the fundamental mode.

In some instances, the higher order mode or modes all have physical mode areas that are each at least 80% larger than the physical mode area of the fundamental mode.

In some instances, the optical fiber has a core-diameter to wavelength ratio of at least 20, wherein the higher order mode or modes all have physical mode areas that are each at least 50% larger than the physical mode area of the fundamental mode.

In some instances, the optical fiber has a core-diameter to wavelength ratio of at least 45, wherein the higher order mode or modes all have physical mode areas that are each at least 40% larger than the physical mode area of the fundamental mode.

In some instances, the optical fiber has a numerical aperture that is less than or equal to 0.11.

In some instances, the optical fiber has a numerical aperture that is less than or equal to 0.08.

In some instances, the optical fiber has a refractive index profile that generally decreases from a center of the fiber to an edge of a fiber core.

In some instances, the refractive index linearly decreases from the center of the fiber to the edge of the fiber core.

In some instances, the refractive index profile generally decreases from near the center of the fiber to the edge of the fiber core over range of less than or equal to 0.0015.

In some instances, the refractive index profile has a step at a core-cladding interface of the optical fiber.

In some instances, the step is greater than or equal to 0.0003.

In some instances, the optical fiber has a gain doping region that does not substantially overlap with the one or more higher order modes.

In some instances, the optical fiber comprises a cylindrical gain doping region centered in a core of the fiber, wherein the gain doping region is substantially smaller than the physical mode areas of the one or more higher order modes.

In some instances, the optical fiber has a core-diameter to wavelength ratio of at least 20 whose intensity overlap with the gain doping region is at least 20% smaller for the one or more higher order modes than it is for the fundamental mode.

In some instances, the optical fiber has a core-diameter to wavelength ratio of at least 25 whose intensity overlap with the gain doping region is at least 10% smaller for the one or more higher order modes than it is for the fundamental mode.

In some instances, the optical fiber has a core-diameter to wavelength ratio of at least 45 whose intensity overlap with the gain doping region is at least 5% smaller for the one or more higher order modes than it is for the fundamental mode.

In some instances, the optical fiber has a core-diameter to wavelength ratio of at least 45 whose intensity overlap with the gain doping region is at least 10% smaller for the one or more higher order modes than it is for the fundamental mode.

In some instances, the optical fiber has a core-diameter to wavelength ratio of at least 45 whose intensity overlap with the gain doping region is at least 20% smaller for the one or more higher order modes than it is for the fundamental mode.

In some instances, the optical fiber is a doped fiber amplifier in a laser system.

In another example, an optical fiber has a fundamental mode and at least one higher order mode, wherein the at least one higher order mode occupies substantially different space than that of the fundamental mode.

In some instances, the at least one higher order mode occupies less than 85% of the space occupied by the fundamental mode.

In some instances, the at least one higher order mode occupies less than 70% of the space occupied by the fundamental mode.

In some instances, the optical fiber is a doped fiber amplifier in a laser system.

In another example, an optical fiber has a solid core with tri-fold azimuthal symmetry, wherein the optical fiber is a large-mode-area doped fiber.

In some instances, the core has three cores that are substantially close to each other.

In some instances, a spacing of the three cores is less than 3 times an optical wavelength of the optical fiber.

In some instances, the core has three nearly identical cores that are substantially close to each other.

In some instances, a spacing of the three cores is less than 3 times the optical wavelength.

In some instances, a gain region of each core is localized in each core towards a center of the fiber.

In some instances, the gain region of each core is offset from a center of each core.

In some instances, the gain region of each core is localized to at most half of each core nearest a center of the fiber.

In some instances, the optical fiber is a fiber amplifier in a laser system.

BRIEF DESCRIPTION OF THE DRAWINGS

FIG. 1 compares fundamental and higher-order modes of a conventional step-index fiber and a graded-index fiber. FIG. 1(*a*) shows modes of a conventional step-index fiber that are nearly the same size. In contrast, FIG. 1(*b*) shows modes of a graded-index fiber that are not of the same size, with higher-order modes being increasingly larger.

FIG. 9 shows fundamental and nearest HOMs calculated for triple-core (Trefoil) fiber. The dashed half-circles indicate the gain regions.

DETAILED DESCRIPTION

Figure 2A:
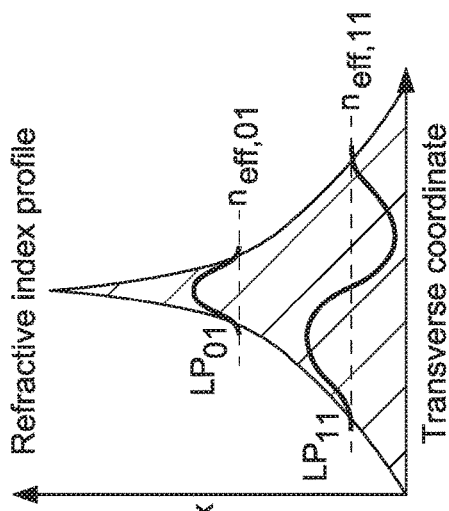
FIG. 2 shows various non-limiting alternative fiber core designs with generally decreasing refractive index profile across the core.
Figure 2B:
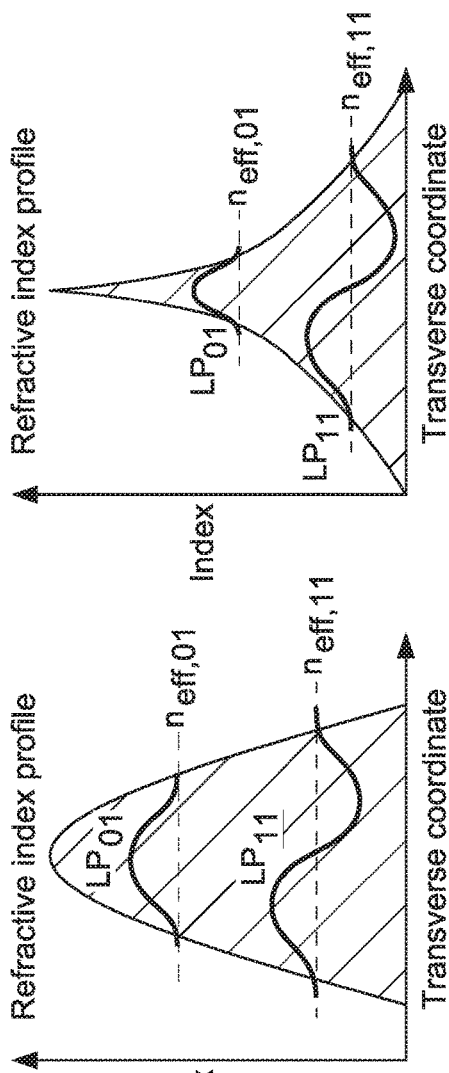
Figure 2C:
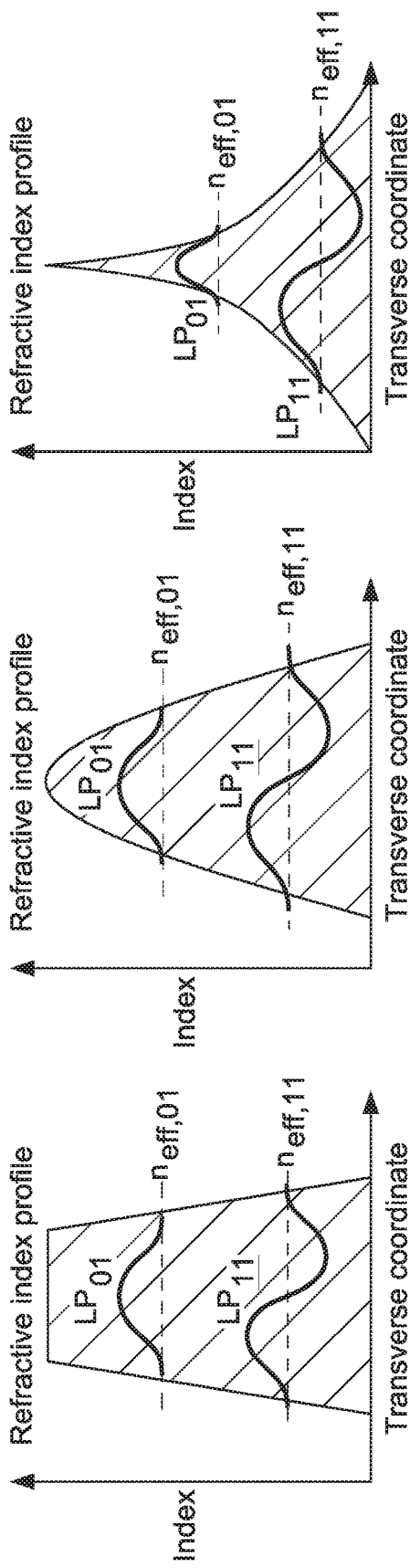
Figure 2D:
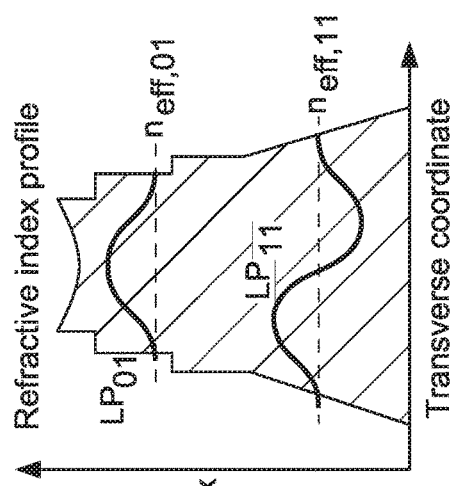
Figure 2E:
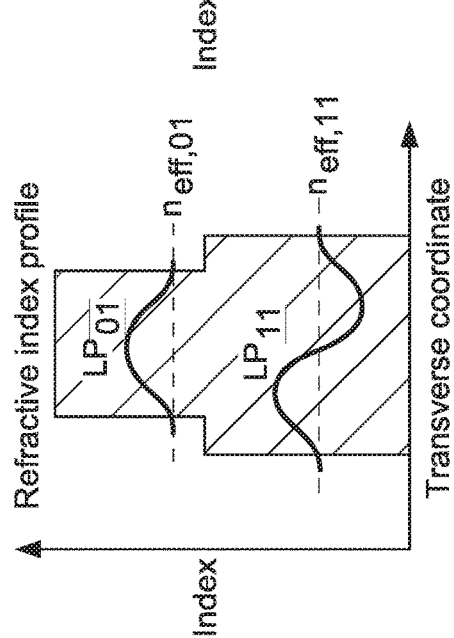
Figure 2F:
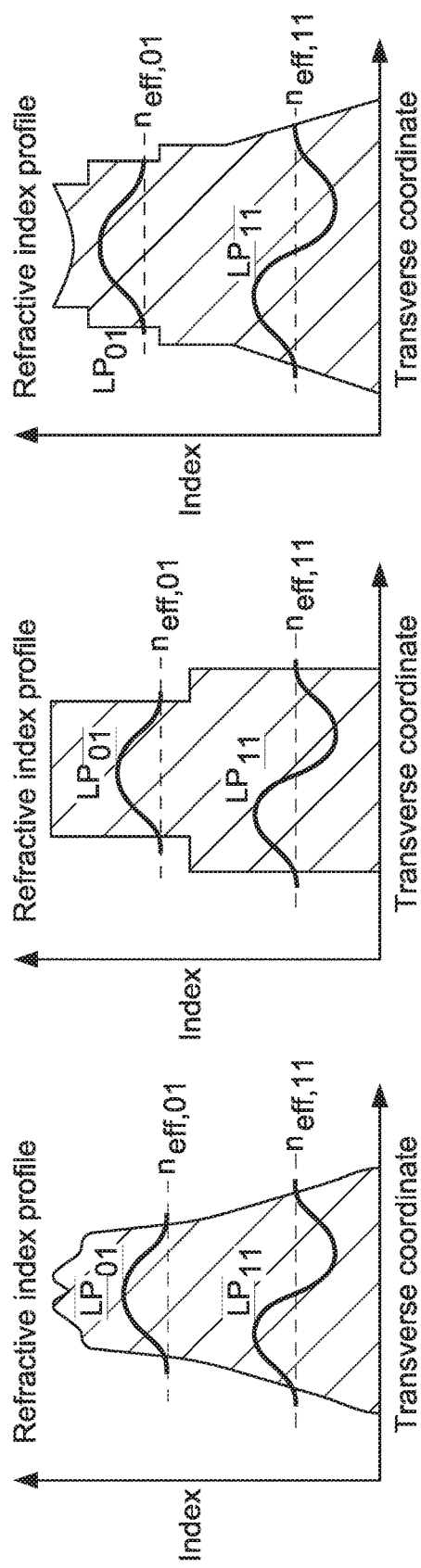

In this section, we describe examples of optical fibers that have higher-order modes that are substantially larger than both the fundamental mode, reducing the spatial overlap between the fundamental and higher-order modes, and the region providing the optical gain, reducing the spatial overlap of the heat generation region with those higher-order modes. Such fibers have a significantly increased TMI threshold.

We have designed active optical fibers that have refractive index profiles that generally decrease from the center of the fiber to the edge of the core. The basic physics of this realization is depicted in FIG. 1. In the simplest terms, waveguide modes are well represented by a quantum mechanical potential (i.e., a quantum well) viewed upside down. The eigenvalues (effective indices) are positioned in the "well" at an appropriate "energy level" (location in refractive index space), and the mode size is largely dictated by the location of the edges of the "well" (refractive index boundary). This concept is shown in FIG. 1(*a*). Note that the modes in this case are approximately the same size and thus have high spatial (intensity) overlap, particularly for highly confined modes.

A detailed calculation of the physical mode area for different LMA fiber diameters is shown in the table below. In this table, the mode size is represented as the physical mode area (an elliptical beam with orthogonal radii represented by the standard deviation of the intensity distribution) and not the nonlinear effective area that is often used to characterize fiber modes for the purpose of evaluating optical nonlinearities. Since a 20 µm LMA fiber only supports two guided modes, the second ($LP_{11}$) mode extends far into the cladding. However, as the core expands, the second mode becomes more confined. This physics is well known to those skilled in the art.

TABLE 1

Mode area for the fundamental ($LP_{01}$) and next ($LP_{11}$)
modes for LMA fiber with 0.06 NA and various core diameters.

| Core diameter | $LP_{01}$ mode area | $LP_{11}$ mode area | Ratio of $LP_{11}/LP_{01}$ mode areas |
|---|---|---|---|
| 20 μm | 259 μm² | 413 μm² | 1.59 |
| 25 μm | 347 μm² | 494 μm² | 1.42 |
| 50 μm | 1075 μm² | 1433 μm² | 1.33 |

Example #1: Expanded HOM Fiber

One new method to reduce the overlap between the modes is to alter the profile of the "well". Based on the above logic, it is reasonable to assume that if the "well" were tapered (i.e., a graded-index), the second mode would be larger than the fundamental mode. This concept is depicted in FIG. 1(b), and is oversimplified since the changes in $n_{eff}$ were not taken into account. Nonetheless, the concept of modifying the waveguide profile to affect the mode sizes stands.

Although a linear graded index is shown in FIG. 1, various refractive index designs for accomplishing the desired HOM expansion are also possible, as depicted in FIG. 2. Note that these are all cross-sectional examples. The refractive index profile of a real three-dimensional fiber would vary in accordance with the various shapes as spun about their axis of symmetry (e.g., the center of the fiber).

Variations from the displayed shapes and deviations expected during fabrication do not affect the physics described by these general and non-limiting examples. Note that it is not required that the fiber core be radially symmetric, although symmetric designs are generally simpler to fabricate.

In a preferred embodiment, the core is surrounded by a cladding that has substantially lower refractive index than that at the outer edge of the core. This is exemplified by the non-limiting example shown in FIG. 3. If this example profile is spun about the axis of symmetry (i.e., the center) of a real fiber as it would in practice, then the three-dimensional refractive index shape formed is that of an obtuse cone atop a cylinder. This specific example is a cladded linear index-graded fiber, or CLING fiber.

Figure 3:
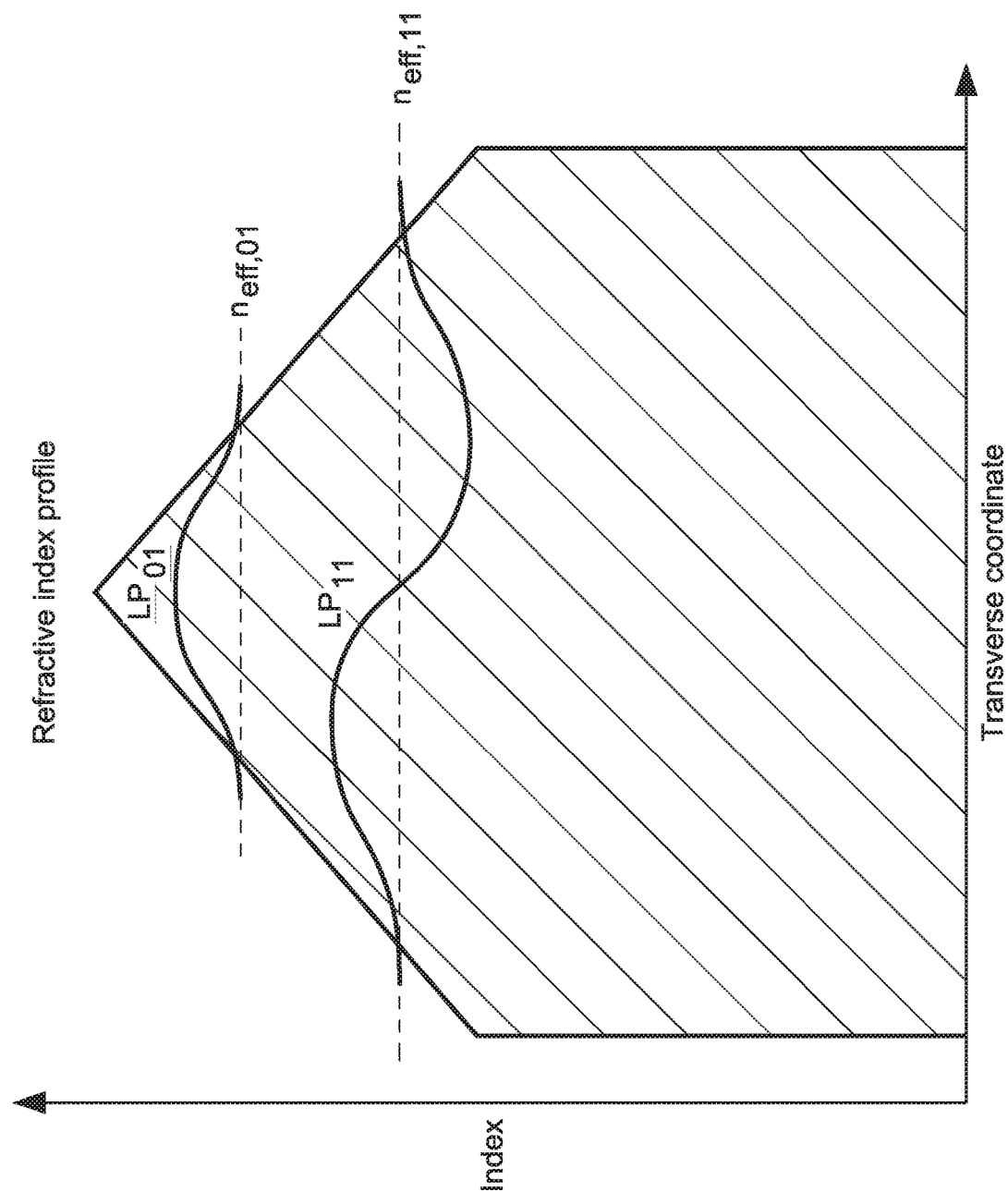
FIG. 3 shows a non-limiting example of a fiber core with generally decreasing refractive index profile across the core, and an abrupt step between the outer edge of the core and the cladding.
Figure 4:
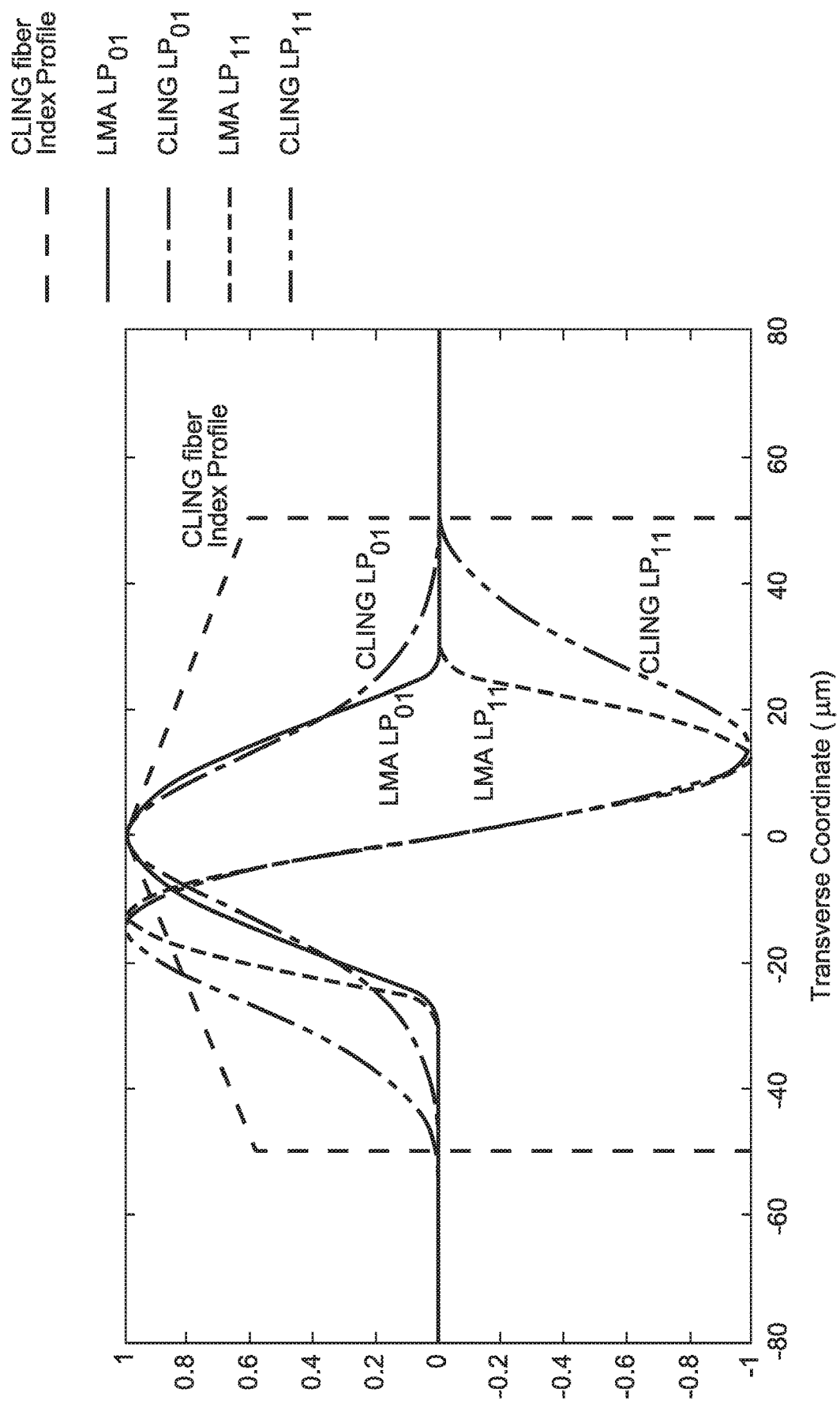
FIG. 4 compares modes of an example of a cladded linear index graded (CLING) fiber compared to modes of a conventional (step-index) LMA fiber with the same mode area. The refractive index profile of the CLING fiber has a 0.00041 index grade with a 0.001 core-clad index step and is shown as the gray dotted line. The LMA fiber has a 50 µm core diameter with a 0.06 NA and is not shown.

To demonstrate the effectiveness of one embodiment of the invention, a specific case of the geometry shown in FIG. 3 is calculated and compared to that of a standard step-index LMA fiber. The results are shown in FIG. 4. While the fundamental modes ($LP_{01}$) of both fibers are nearly identical, the next mode ($LP_{11}$) is clearly substantially wider in the CLING fiber compared to that of the LMA fiber. In this specific non-limiting example, the $LP_{11}$ mode is 1.9 times larger (in physical mode area) than the $LP_{01}$, which is significantly larger than the LMA cases, as shown in Table 1.

Having a generally decreasing graded index profile provides differing effective radii of confinement for separate lateral modes of the signal light with the fundamental mode being confined to the narrowest region as shown in FIGS. 1-4. The TMI coupling coefficient given in Eqn. 1 shows that the reduced spatial overlap of the fundamental mode with the HOMs is beneficial. In addition, if the HOMs are expanded without expanding the gain region, then the perturbation itself (δn in Eqn. 1 that is generated thermally by the energy efficiency of the gain medium) is also reduced. Therefore, increasing the HOM size by itself results in a double benefit: reducing the overlap of the HOMs with the fundamental mode, and reducing the overlap of the HOMs with the perturbation.

An example of this is given in Table 2, which shows the overlap of the fundamental and closest higher-order mode for LMA fibers with the gain. Note that in all cases, the overlap of the $LP_{11}$ mode with the gain is high, and increases as the fiber scales to larger core diameters. Stated another way, the reduction of the $LP_{11}$ overlap with the gain relative the $LP_{01}$ overlap with the gain is small for standard LMA fiber and decreases rapidly at the core diameter increases. In contrast, our discovery of increasing the mode size results in significantly lower overlap of the HOMs with the gain. For the CLING fiber example previously calculated, which has a larger fundamental mode than a 50 μm LMA fiber, the HOM-overlap with the gain is 71%, significantly lower than that of standard LMA fiber of any core diameter. Moreover, the reduction of the $LP_{11}$ overlap with the gain relative the $LP_{01}$ overlap with the gain is quite large, approaching 25%.

TABLE 2

Intensity overlap of the fundamental ($LP_{01}$) and next ($LP_{11}$)
modes for (i) LMA fiber with 0.06 NA and various core diameters
and (ii) the CLING fiber. The final column is the reduction in the overlap
of the $LP_{11}$ mode relative to the $LP_{01}$ mode.

| Core diameter | $LP_{01}$ overlap with gain | $LP_{11}$ overlap with gain | Gain overlap reduction |
|---|---|---|---|
| 20 μm | 0.9265 | 0.7726 | 16.6% |
| 25 μm | 0.9594 | 0.8823 | 8.0% |
| 50 μm | 0.9935 | 0.9829 | 1.1% |
| CLING | 0.9340 | 0.7111 | 23.9% |

The net result of these two reductions to the mode-coupling coefficient in the TMI threshold is drastic. In the single non-limiting example of the CLING fiber, a 60% increase in the threshold signal power of thermal mode instability for a 50 μm LMA fiber.

Figure 5:
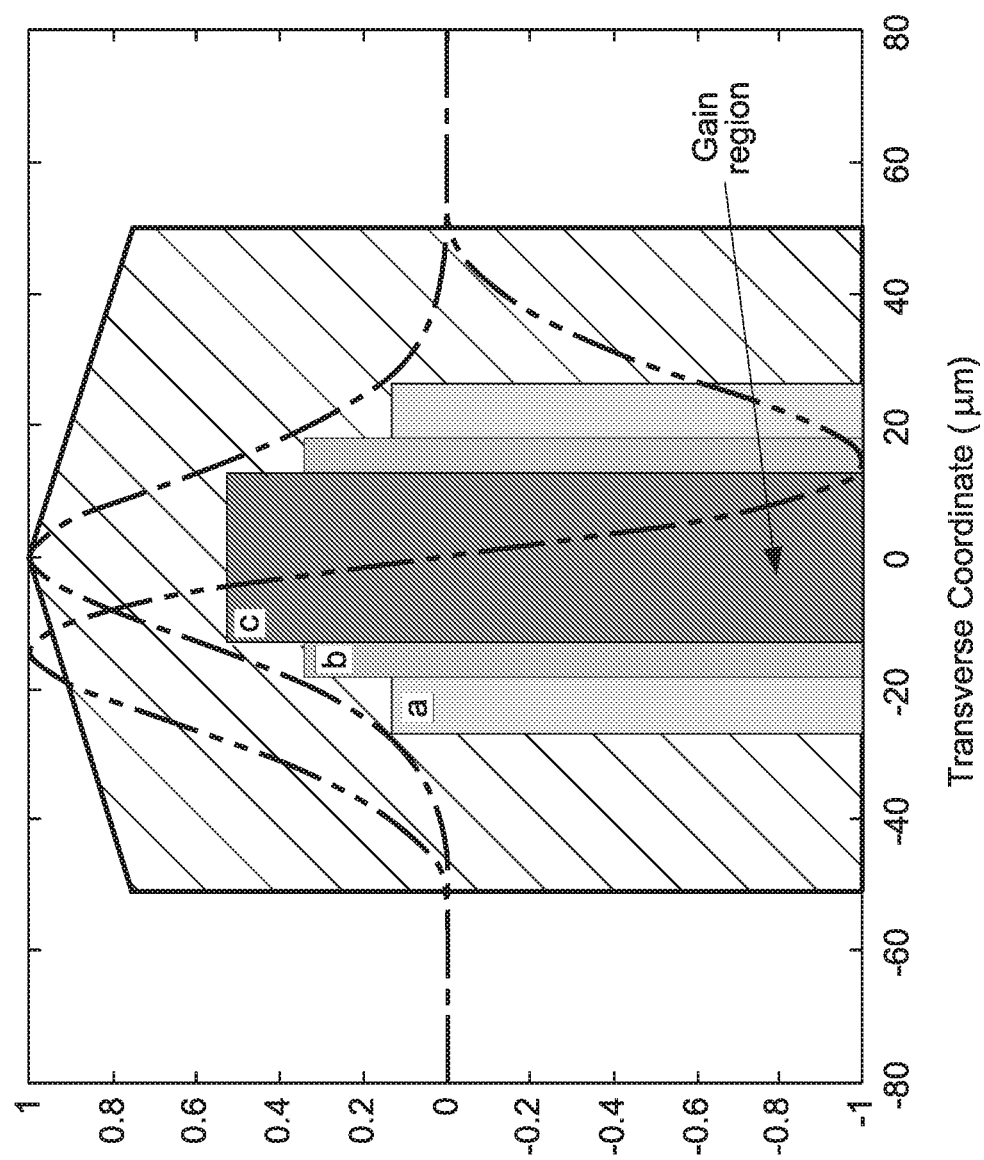
FIG. 5 depicts modes of interest in an example of a CLING fiber with (a) doping density and profile for the equivalent conventional 50 micron fiber, showing options (b,c) with increased doping density (represented by height) but with a narrower profile to provide reduced overlap with the $LP_{11}$ HOM.

The latter concept of reducing the overlap of the higher-order modes with the gain can be taken one additional step further. If the gain that nominally spans the fundamental mode were made smaller than the fundamental mode, then the coupling coefficient given in Eqn. 1 would be even smaller. This concept is shown in a non-limiting case in FIG. 5 for the CLING fiber example. Instead of the gain region filling the area of the fundamental mode as in case (a), it can be made smaller as in case (b) or (c) to further decrease the TMI coupling coefficient. Those skilled in the art recognize that gain can be provided by ionic doping (for example ytterbium, erbium, or thulium), nonlinear processes (for example stimulated Raman scattering), and other means.

It has been shown that in the absence of TMI, making the gain region smaller than the fundamental mode can produce optimal benefits for beam quality (filtering out HOMs) without significantly impacting the efficiency of the amplifier. With the addition of TMI physics, the confined gain region adds an additional benefit in reducing the TMI coupling coefficient, thereby increasing the TMI threshold and allowing higher amplifier output power with stable beam quality.

Example #2: Broken Azimuthal Symmetry Fiber

Another new method to reduce the overlap between the modes is to alter the symmetry of the "well". By changing the symmetry of the core refractive index profile, it is reasonable to assume that the mode shapes will also change.

For example, the $LP_{11}$ mode of a round fiber has a mirror symmetry such that the each half of the mode look identical in intensity, albeit opposite in phase. If the symmetry of the core refractive index core is broken such that there is no longer azimuthal symmetry, then the shape and location of the $LP_{11}$ mode will necessarily be highly modified. The spatial modification can not only provide lower spatial overlap with the fundamental mode, but also lower spatial overlap with the gain. Both of these factors contribute to reducing the mode-coupling coefficient in Equation (1) and will lead to an increase in the TMI threshold.

Figure 6B:
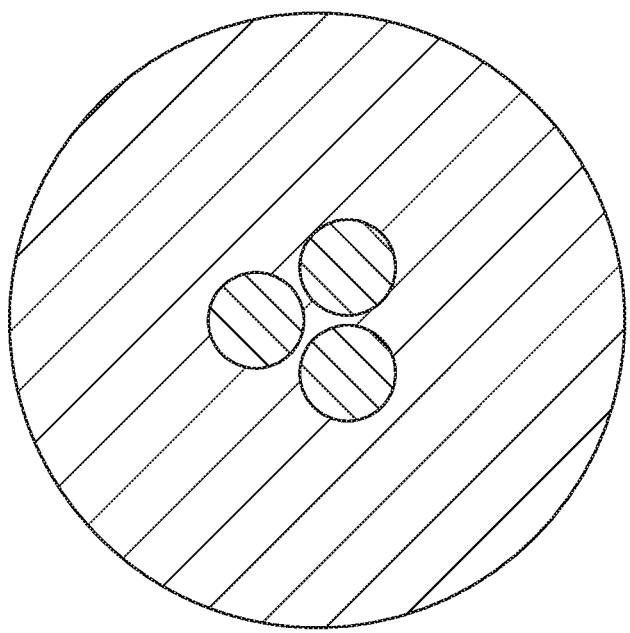
FIG. 6 shows non-limiting examples of transverse cross sections of optical fibers having tri-fold azimuthal symmetry. The outer cross hatched areas represent the fiber cladding, while the inner cross hatched triangle (A) and circles (B) represents the fiber core(s).
Figure 6A:
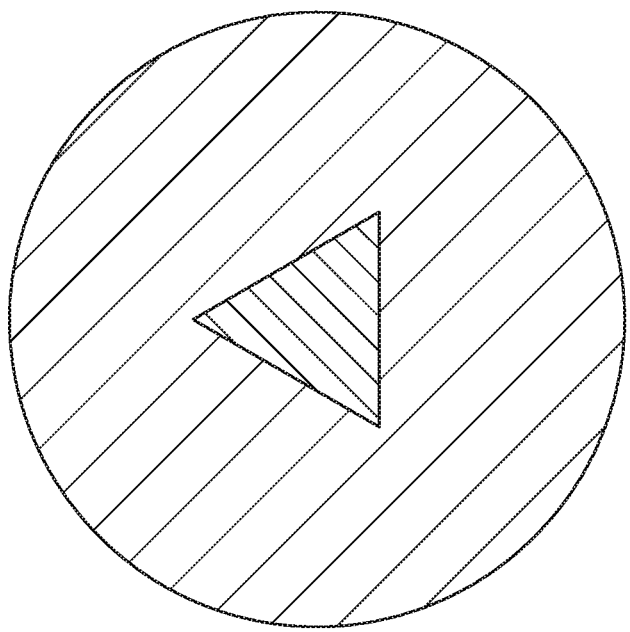

One strong method for eliminating the azimuthal symmetry is by using a core with three-fold-only symmetry. Several non-limiting examples of inducing three-fold symmetry into the refractive index profile of the core of an optical fiber are shown in FIG. 6. A triangular core, as shown in FIG. 6(a), represents perhaps the most straightforward conceptualization, however manufacturing of such a core presents fabrication challenges. A simpler fabrication option is to use three separate but closely spaced cores, as shown in in FIG. 5(b). Such a triad of cores maintains the three-fold symmetry while at the same time allowing for simpler fabrication.

Figure 7:
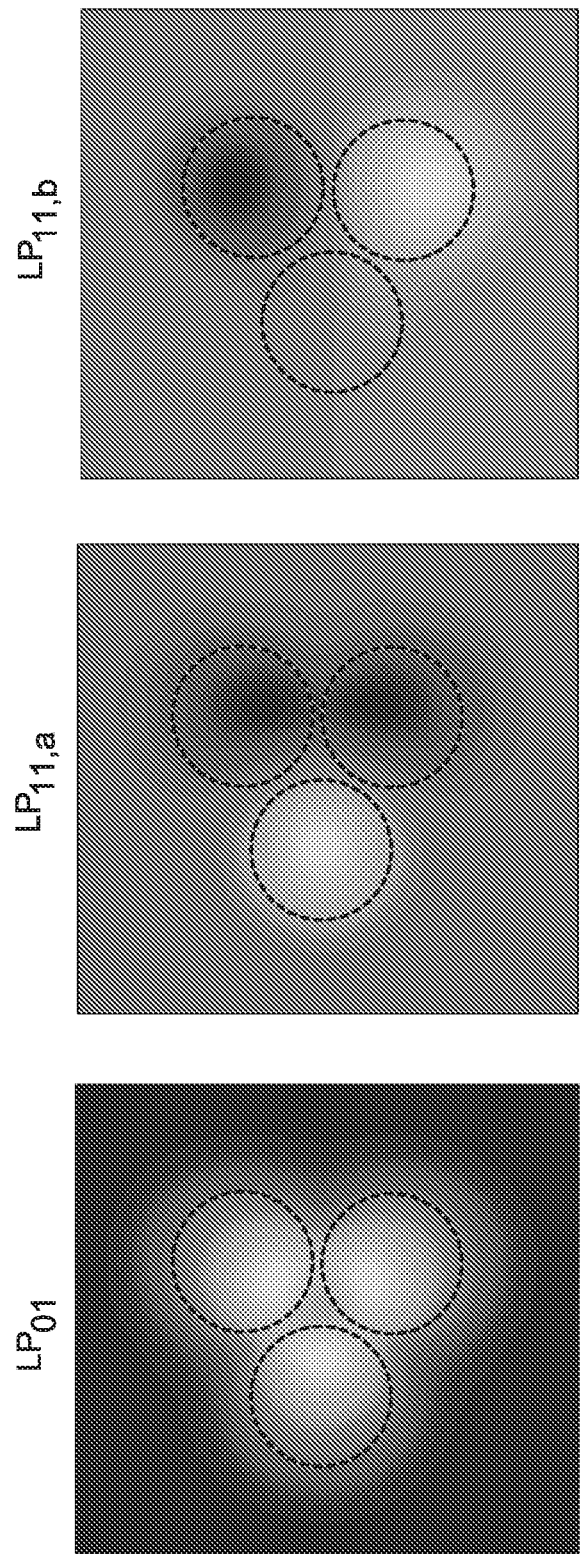
FIG. 7 shows fundamental and nearest HOMs calculated for an example of a triple-core (Trefoil) fiber. The dashed circles indicate the core locations.

The triple-core fiber, which we call Trefoil fiber due to its similarity to the architectural feature of the same name, does indeed significantly shift the spatial distribution of the $LP_{11}$ modes. FIG. 7 shows an example of a triple-core fiber, using three standard 25 µm LMA fiber cores arranged in an equilateral distribution. Note that the fundamental ($LP_{01}$) mode is largely contained to the innermost region of the three cores, the $LP_{11}$ modes are not. In conventional, round, azimuthally-symmetric fibers, the $LP_{11,a}$ and $LP_{11,b}$ modes look identical, except for a rotation of 90-degrees. In this new fiber with azimuthally-broken symmetry, the $LP_{11,a}$ and $LP_{11,b}$ modes are distinctly different. The $LP_{11,a}$ mode has one lobe fully occupying one of the three cores, while the other lobe is stretched across the other two cores. The $LP_{11,b}$ mode only has substantial power in two of the three cores, with the third core carrying very little power. In both cases, the $LP_{11}$ modes largely avoid the center of the fiber with their power more concentrated in the middle of the three cores. This is in direct contrast to the $LP_{01}$ mode, which has its power concentrated towards the inner edge of the three cores and in the area between the cores. The non-limiting example shown in FIG. 7 clearly demonstrates how breaking the azimuthal symmetry separates the fundamental mode spatially from its nearest neighbor HOMs.

Figure 8B:
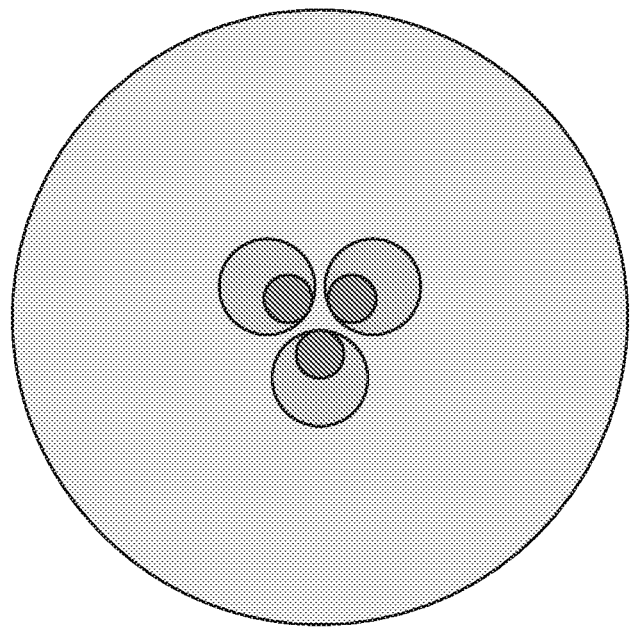
FIG. 8 shows examples of Trefoil fibers with spatially localized gain.

The concept of reduced overlap with the gain also applies to this fiber type, particularly for localizing the gain towards the center of the fiber. In a non-limiting example, FIG. 8 shows spatially localizing the gain in the Trefoil fiber using practical manufacturing methods. In 8(a), two core halves, one with gain and one without, together comprise the core. In 8(b), each core preform has an offset confined gain region. Other configurations are readily obvious to those skilled in the art.

Figure 8A:
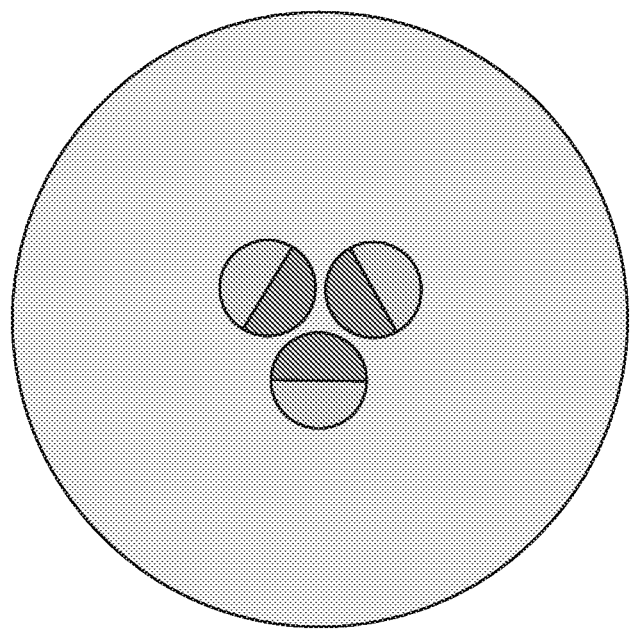

The impact of the particular example in FIG. 8(a) is shown in FIG. 9, where it is readily obvious that the $LP_{11}$ modes have significantly lower overlap with the gain region than the fundamental ($LP_{01}$) mode. While the $LP_{01}$ modes largely resides in the half of each of the cores that contain the gain, the LP11 modes do not. In one of the cores, the $LP_{11,a}$ only is half in the gain region. For the $LP_{11,b}$ mode, the majority of the power is clearly not in the gain region.

Table 3 shows the overlap of the gain region with the fundamental and closest higher-order modes for the Trefoil fiber example shown in FIG. 8(a). In particular, the reduction of the $LP_{11}$ overlap with the gain relative the $LP_{01}$ overlap with the gain is very large, over 24%, which is quite significant particularly when compared to the LMA fiber shown in Table 2.

TABLE 3

Intensity overlap of the fundamental ($LP_{01}$) and next ($LP_{11}$) modes for the Trefoil fiber where only the half of each core nearest the center of the fiber contains the gain. The final column is the reduction in the overlap of the $LP_{11}$ modes relative to the $LP_{01}$ mode.

| Trefoil fiber mode | Intensity overlap with gain | Gain overlap reduction |
|---|---|---|
| $LP_{01}$ | 0.7771 | n/a |
| $LP_{11/a}$ | 0.5875 | 24.4% |
| $LP_{11/b}$ | 0.5515 | 29.0% |

The net result of these two concepts, broken azimuthal symmetry and redistributing the HOMs intensity outside the gain region, specifically using the non-limiting Trefoil fiber example shown in FIG. 8(a), resulted in a simulated 40% increase in the TMI threshold over that of a conventional 50 µm LMA fiber.

It must be noted that in addition to the benefits of increasing the TMI threshold, this new concept of redistributing the HOMs allows for radically new methods for exploiting gain filtering for single-mode behavior even in the absence of TMI.

It will be appreciated that variants of the above-disclosed examples and other features and functions, or alternatives, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An optical fiber comprising a core configured to guide light propagating in a fundamental mode and at least one higher order mode, wherein:
   the higher order mode or modes have physical mode areas that are at least 60% larger than a physical mode area of the fundamental mode, to reduce thermal mode instability between the fundamental mode and the at least one higher order mode;
   a refractive index profile of the optical fiber comprises a graded-index portion and a step at a core-cladding interface of the optical fiber; and
   an index difference between a center of the core and a cladding is equal to or greater than 0.00141.

2. The optical fiber of claim 1, wherein the higher order mode or modes have physical mode areas that are each at least 80% larger than the physical mode area of the fundamental mode.

3. The optical fiber of claim 1, wherein the optical fiber comprises a core-diameter to wavelength ratio of at least 20.

4. The optical fiber of claim 1, wherein the optical fiber comprises a numerical aperture that is less than or equal to 0.11.

5. The optical fiber of claim 1, wherein the optical fiber comprises a numerical aperture that is less than or equal to 0.08.

6. The optical fiber of claim 1, wherein the optical fiber comprises a refractive index profile of the core that has a graded index difference measured from the center of the core to an edge of the core, a total index difference between the core and the cladding measured from the center of the core to the cladding, and the graded index difference divided by the total index difference is equal to or less than 0.29.

7. The optical fiber of claim 1, wherein the optical fiber comprises a refractive index profile that has a flat top and a linear graded index portion.

8. The optical fiber of claim 1, wherein the refractive index profile generally decreases from the center of the optical fiber to an edge of the core over a range of less than or equal to 0.0015.

9. The optical fiber of claim 1, wherein the step is greater than or equal to 0.0003.

10. The optical fiber of claim 1, wherein the optical fiber comprises a gain doping region that is smaller than the physical mode area of the fundamental mode.

11. The optical fiber of claim 1, wherein the optical fiber comprises a cylindrical gain doping region centered in the core of the optical fiber, wherein the cylindrical gain doping region is smaller than the physical mode areas of the one or more higher order modes.

12. The optical fiber of claim 11, wherein the optical fiber comprises a core-diameter to wavelength ratio of at least 20 whose intensity overlap with the cylindrical gain doping region is at least 20% smaller for the one or more higher order modes than it is for the fundamental mode.

13. The optical fiber of claim 11, wherein the optical fiber comprises a core-diameter to wavelength ratio of at least 25 whose intensity overlap with the cylindrical gain doping region is at least 10% smaller for the one or more higher order modes than it is for the fundamental mode.

14. The optical fiber of claim 11, wherein the optical fiber comprises a core-diameter to wavelength ratio of at least 45 whose intensity overlap with the cylindrical gain doping region is at least 10% smaller for the one or more higher order modes than it is for the fundamental mode.

15. The optical fiber of claim 11, wherein the optical fiber comprises a core-diameter to wavelength ratio of at least 45 whose intensity overlap with the cylindrical gain doping region is at least 20% smaller for the one or more higher order modes than it is for the fundamental mode.

16. The optical fiber of claim 1, wherein the optical fiber is a doped fiber amplifier in a laser system.

* * * * *